No. 711,422. Patented Oct. 14, 1902.
C. E. GREENLIEF.
WRENCH.
(Application filed Feb. 18, 1902.)
(No Model.)
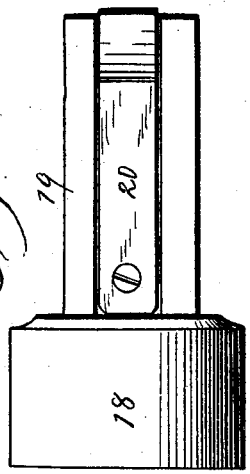
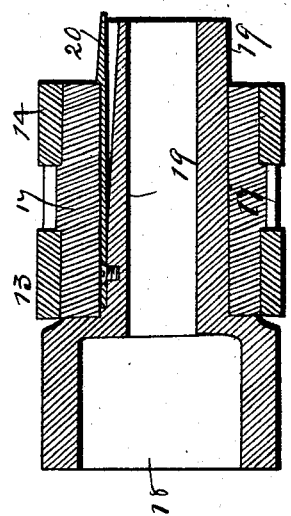
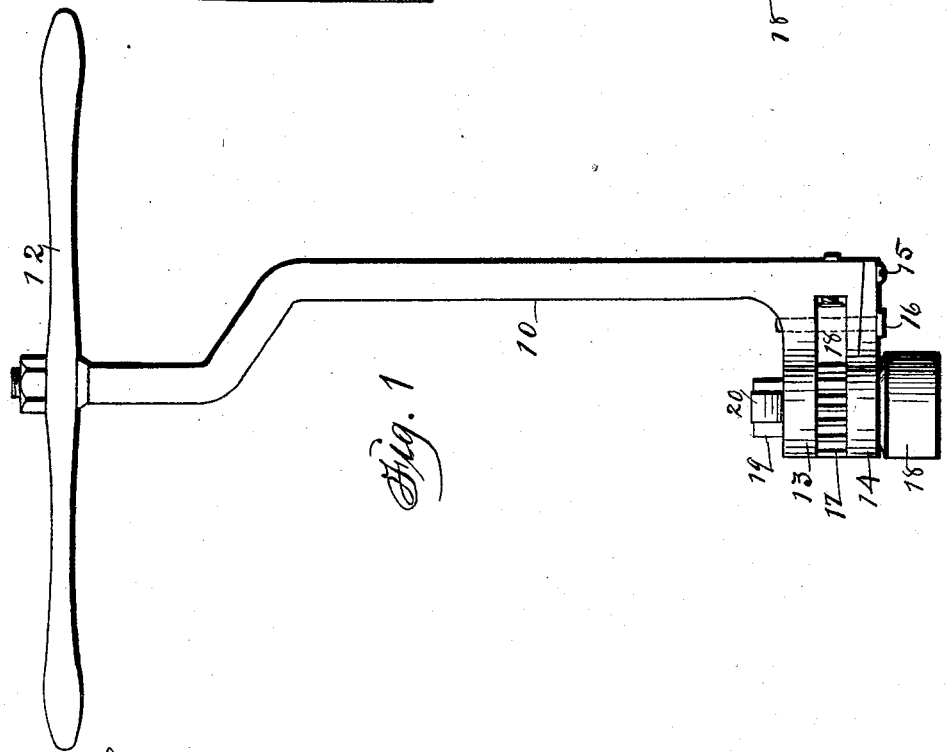
Witnesses:
L. H. Orwig.
R. G. Orwig.
Inventor: Charles E. Greenlief,
By Thomas G. Orwig, Attorney.
THE NORRIS PETERS CO., PHOTO-LITHO., WASHINGTON, D. C.

UNITED STATES PATENT OFFICE.

CHARLES E. GREENLIEF, OF NEWTON, IOWA, ASSIGNOR TO PARSON'S BAND CUTTER AND SELF FEEDER CO., OF NEWTON, IOWA.

WRENCH.

SPECIFICATION forming part of Letters Patent No. 711,422, dated October 14, 1902.

Application filed February 18, 1902. Serial No. 94,659. (No model.)

*To all whom it may concern:*

Be it known that I, CHARLES E. GREENLIEF, a citizen of the United States, residing at Newton, in the county of Jasper and State of Iowa, have invented a new and useful Wrench, of which the following is a specification.

My object is to provide a wrench that is adapted for extending the handle in a plane parallel to a tooth in the cylinder of a threshing-machine for turning a nut on the inner end of the tooth and also adapted for turning a nut on a bolt when the screw on the end of the bolt projects toward the operator.

A further object is to detachably and interchangeably connect chucks with the handle for operating nuts of different size at different times.

Heretofore a stock has been used having its end portions arranged in different but substantially parallel planes and offset intermediate its ends, a cross-head or handle fitted to one end thereof, parallel ears or brackets extended from the opposite end of said stock and at right angles thereto and provided at their outer ends with rings or collars set a slight distance apart, a chuck journaled in said collars and rotatable on an axis parallel to the stock and also embodying a circumferential series of teeth lying between the collars, and a reversible two-edged spring-pressed dog fulcrumed on an axis parallel to the stock to engage said teeth, and all the parts permanently connected so a nut could be moved thereby on the inner end of a cylinder-tooth or on the outer end of a screw; but in no instance has a handle been made for detachably, interchangeably, and reversibly connecting chucks adapted for nuts different in size to operate them on the inner ends of cylinder-teeth or the outer ends of screw-bolts, as contemplated by my invention, which consists in the construction, arrangement, and combination of parts, as hereinafter set forth, and pointed out by my claims.

In the accompanying drawings, Figure 1 is a side view that shows all the parts connected as required for practical use. Fig. 2 is a face view of a chuck adapted to be detachably and reversibly connected with the stock by simply sliding its shank in and out of the cavity that it is fitted to enter. Fig. 3 is a sectional view that shows a chuck detachably connected with the ratchet-wheel and the journals that extend therefrom to support the rotatable ratchet-wheel in its bearings.

The numeral 10 designates the stock, provided with a handle 12 at its top and an integral bearing 13, extending at right angles from the lower portion of the stock. A mating bearing 14 is fitted and fixed to a lateral projection at the bottom of the stock by means of a screw 15 and a screw-bolt 16, as shown in Fig. 1. A ratchet-wheel 17 has journals on its ends fitted in the bearings 13 and 14 and is provided with an angular bore of uniform size from end to end that extends through the journals and wheel and is adapted to admit the shank 19 of a chuck adapted to slide in and out of the said angular bore and reversed to project upward or downward, as required for readily, reversibly, and interchangeably attaching chucks adapted for nuts of different sizes on the lower end of a cylinder-tooth or on the upper end of a rod, bolt, or bar. A spring-actuated duplex pawl 18 is pivoted on the bolt 16 between the bearings 13 and 14 to engage the teeth of the ratchet-wheel 17 to rotate said wheel alternately in reverse ways, as required to actuate the chuck for fastening and unfastening nuts.

The chuck-socket $18\tfrac{1}{2}$ is integral with the shank 19 and is circular in form and has an angular cavity adapted in size and shape to be placed on a nut, and the angular shank is adapted to slide in and out of the angular bore that extends through the ratchet-wheel 17 and its journals, as shown in Fig. 3, and is also adapted to enter the lower or upper end of the bore, and therefore adapted to be reversed relative to the stock 10 and a nut on the lower end of a cylinder-tooth or the upper end of a bolt. In the face of the shank is a depression, and in the depression is fitted and fixed a spring-latch 20, adapted to engage the ends of the journals of the ratchet-wheel 17, as required to lock the chuck to the wheel. By simply depressing the free end of the latch the chuck can be unfastened and then pulled out of the ratchet-wheel and its journals and reversed or interchanged, so that chucks adapted for different-sized nuts can be used to draw a nut upward on a screw or drive it downward at pleasure of the operator. It is therefore obvious that chucks adapted for nuts of different sizes may be readily and interchangeably and advantageously attached and detached and reversed in position relative to the handle at pleasure.

Having thus described the construction and operation of my invention, its practical utility will be readily understood by persons familiar with the art to which it pertains.

What I claim as new is—

1. In a wrench, a handle having fixed wheel-bearers extending at right angles from its lower end, a ratchet-wheel having journals at its end mounted in said bearers and an angular bore of uniform diameter extended through the axis of the wheel and journals and a reversible chuck having a shank fitted in said bore and provided with a spring-latch to engage the ends of the journals, in the manner set forth, for the purposes stated.

2. An improved wrench comprising a stock having a lateral bend and a handle at its top and lateral extensions and fixed journal-bearers at its lower end extended at right angles, a ratchet-wheel having journals and an angular bore of uniform size from end to end extended through the wheel and journals to admit the shank of a chuck at either end of the bore, a duplex spring-actuated pawl pivoted between the journal-bearers, a chuck having an enlarged end provided with an angular cavity to admit a nut and an integral angular shank of uniform size from end to end fitted in the bore of the wheel and its journals and a spring-latch fixed in a recess in the shank, arranged and combined to operate in the manner set forth for the purposes stated.

CHARLES E. GREENLIEF.

Witnesses:
W. O. McELROY,
F. M. TAYLOR.